United States Patent
Gupta et al.

(10) Patent No.: US 10,983,909 B2
(45) Date of Patent: Apr. 20, 2021

(54) TRADING OFF CACHE SPACE AND WRITE AMPLIFICATION FOR B$^\varepsilon$-TREES

(71) Applicant: VMware, Inc., Palo Alto, CA (US)

(72) Inventors: Abhishek Gupta, Sunnyvale, CA (US); Robert T. Johnson, Palo Alto, CA (US); Richard P. Spillane, Mountain View, CA (US); Sandeep Rangaswamy, Mountain View, CA (US); Jorge Guerra Delgado, Fremont, CA (US); Kapil Chowksey, Cupertino, CA (US); Srinath Premachandran, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 84 days.

(21) Appl. No.: 16/252,488

(22) Filed: Jan. 18, 2019

(65) Prior Publication Data
US 2020/0233801 A1    Jul. 23, 2020

(51) Int. Cl.
| | |
|---|---|
| *G06F 12/0804* | (2016.01) |
| *G06F 16/22* | (2019.01) |
| *G06F 7/16* | (2006.01) |
| *G06F 16/2455* | (2019.01) |

(52) U.S. Cl.
CPC ............ *G06F 12/0804* (2013.01); *G06F 7/16* (2013.01); *G06F 16/2246* (2019.01); *G06F 16/24553* (2019.01); *G06F 2212/1044* (2013.01)

(58) Field of Classification Search
None
See application file for complete search history.

(56) References Cited

U.S. PATENT DOCUMENTS

| | | | | |
|---|---|---|---|---|
| 2014/0114951 | A1* | 4/2014 | Sasaki ................. | G06F 11/3452 707/715 |
| 2015/0293958 | A1* | 10/2015 | Chen ................... | G06F 16/2246 707/797 |
| 2017/0351726 | A1* | 12/2017 | Dean ................... | G06F 16/2246 |
| 2018/0225322 | A1* | 8/2018 | Boles ................... | G06F 16/9027 |
| 2018/0260136 | A1* | 9/2018 | Huo ....................... | G06F 3/068 |
| 2018/0349374 | A1* | 12/2018 | Gurajada .............. | G06F 3/0653 |

* cited by examiner

*Primary Examiner* — Charles Rones
*Assistant Examiner* — Jonah C Krieger
(74) *Attorney, Agent, or Firm* — Patterson + Sheridan, LLP (57) ABSTRACT

Certain aspects provide systems and methods for performing an operation on a B$^\varepsilon$-tree. A method comprises writing a message associated with the operation to a first slot in a first buffer of a first non-leaf node of the B$^\varepsilon$-tree in an append-only manner, wherein a first filter associated with the first slot is used for query operations associated with the first slot. The method further comprises determining that the first buffer is full and, upon determining to flush the message to a non-leaf child node, flushing the message in an append-only manner to a second slot in a second buffer of the non-leaf child node, wherein a second filter associated with the second slot is used for query operations associated with the second slot. The method further comprises, upon determining to flush the message to a leaf node, flushing the message to the leaf node in a sorted manner.

15 Claims, 6 Drawing Sheets

TRADING OFF CACHE SPACE AND WRITE AMPLIFICATION FOR $B^\varepsilon$-TREES

BACKGROUND

B-trees are frequently used in various storage or database systems as a method and structure of storing data. Such storage systems may include one or more physical or virtual devices, including conventional hard disk drives of a computing device, Storage Area Network (SAN) devices or Virtual Storage Area Network (vSAN) devices. B-trees feature a balancing tree structure where inserted data is sorted during insertion. B-trees typically include a set of nodes each containing one or more key-value pairs. A key is an identifier of data, and a value is either the data itself or a pointer to a location (e.g., in memory or on disk) of the data associated with the identifier. Accordingly, a B-tree may be sorted according to the keys of the key-value pairs, and data can be read/written from the tree based on the key associated with the data. Because B-trees contain sorted key-value pairs, a read operation such as a query (e.g., a request for the value associated with a particular key in a data structure) to a B-tree may be completed by traversing the B-tree relatively quickly to find the desired key-value pair based on the key of the query. Thus, B-trees can be used to store data in a way that improves performance relative to other data structures (such as arrays) for certain operations (e.g., a query to an un-sorted array may take longer than a query to a B-tree).

$B^\varepsilon$-trees are a modification of B-trees and are similar in many respects to B-trees. Unlike a B-tree, however, each node of a $B^\varepsilon$-tree, except the leaf nodes, includes, in addition to key-value pairs, a buffer. The buffers of a $B^\varepsilon$-tree may store operations to be performed on the $B^\varepsilon$-tree as messages. For example, a message may indicate a key and a write or update operation (e.g., set the value, add, subtract, multiply, delete, change, etc.) to perform on the value associated with the key in a key-value pair. Accordingly, a message may also be considered a type of key-value pair with the value being the operation to perform on a value of another key-value pair with the same key. The buffers may be used to store messages until a size limit is reached, at which point the messages may be flushed to child nodes and applied to key-value pairs in the child nodes (e.g., by performing a merge or compaction), which may include adding new nodes to the $B^\varepsilon$-tree or balancing the $B^\varepsilon$-tree by transferring nodes from one subtree to another. The buffers of $B^\varepsilon$-trees allow write operations to be performed more quickly relative to standard B-trees, as write operations on existing key-value pairs or insertions of new key-value pairs may not traverse the entire $B^\varepsilon$-tree to be applied immediately and may instead be placed in a buffer of any node associated with the key of the message, possibly near the root of the $B^\varepsilon$-tree.

When a new message is added to a buffer, the existing contents of the buffer are read and then merged with the new message. The resulting content is then sorted and written back to the buffer. As such, although $B^\varepsilon$-trees reduce write amplification in comparison to B-trees, the I/O operations associated with re-writing a buffer, when a new message is added to the buffer, introduces some write amplification. To address this problem, in some cases, an append-only method may be applied to $B^\varepsilon$-trees, which involves writing data in all the nodes of the $B^\varepsilon$-trees in a sequential manner. $B^\varepsilon$-trees using the append-only method may be referred to as append-only $B^\varepsilon$-trees. For example, as a result of using the append-only method, buffers are no longer re-written when messages are flushed down. Instead, messages are appended to the buffers in fragments or slots. A slot or a fragment refers to a sorted data structure, such as an array or a B-tree, that is created for storing a batch of one or more messages that is flushed down to a buffer at a certain time. In an append-only $B^\varepsilon$-tree, the append-only method is also applied when data is written to the leaf-nodes of the $B^\varepsilon$-tree.

Although the append-only method reduces write amplification, querying append-only $B^\varepsilon$-trees is less efficient and results in more overhead because messages and/or key-value pairs in the nodes are no longer always sorted. In order to enhance the efficiency and reduce the overhead associated with query operations performed on an append-only $B^\varepsilon$-tree, one of a number of data structures or filters, such as a bloom filter, may be created, stored in RAM, and used for optimizing query operations associated with each of the slots in nodes of the append-only $B^\varepsilon$-tree. In some cases, however, the collective size of all filters associated with an append-only $B^\varepsilon$-tree may be so large that the filters may occupy a significant amount of memory space in random access memory (e.g., RAM) or, in some other cases, not even fit in RAM.

DETAILED DESCRIPTION

Figure 1:
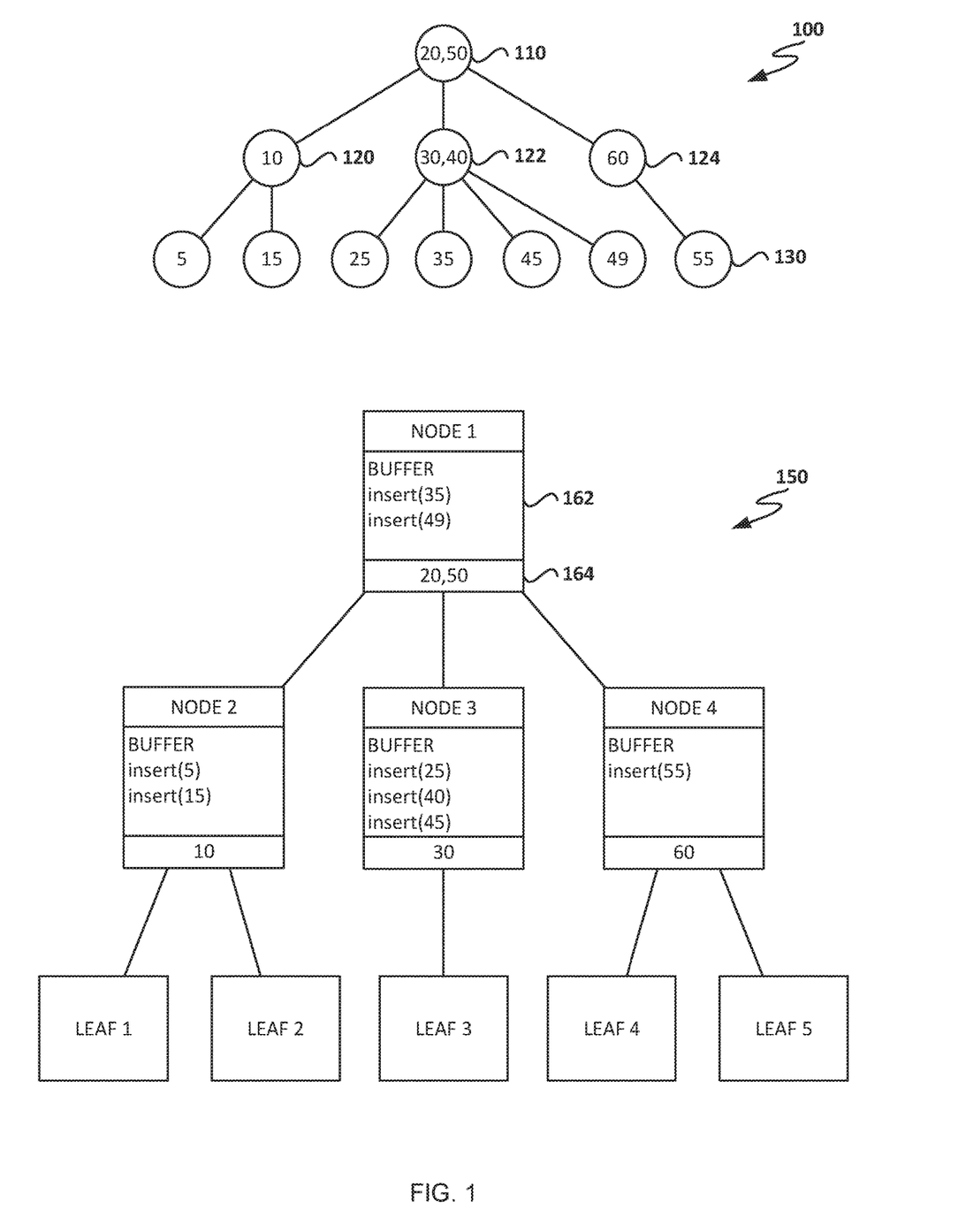
FIG. 1 is a block diagram of an example $B^\varepsilon$-tree, in accordance with certain aspects.

FIG. 1 is a block diagram of an example B-tree 100 and a $B^\varepsilon$-tree 150, each storing the same data. As illustrated, B-tree 100 includes a plurality of nodes connected in a branching tree structure. Each node has one parent but may have many children. The top node of a B-tree is root node 110, which has no parent node. The middle level of B-tree 100 are branch nodes which have both parent and child nodes, including branch nodes 120-124. B-tree 100 has only three levels, and thus only a single branch level, but other B-trees may have more branch levels and total levels. The bottom level of B-tree 100 is comprised of leaf nodes (also referred to as leaves) with no children, including leaf node 130. In total, B-tree 100 has eleven nodes and a height of three. The height of a tree is the number of levels of nodes contained in the tree.

Each node of B-tree 100 stores at least one key-value pair. For example, leaf node 130 stores the key-value pair corresponding to the key "55." The leaf nodes in B-tree 100 each store a single key-value pair but an individual leaf node may store additional key-value pairs. For branch and root nodes of B-tree 100, key-value pairs may store values. Key-value pairs in branch and root nodes may also store pointers to child nodes, which can be used to locate a given key-value pair that is stored in a child node. For example, root node 110 includes two key-value pairs, "20" and "50". These key-value pairs indicate that key-value pairs with keys less than "20" can be found by accessing branch node 120, key-value pairs with keys greater than "20" but less than "50" can be found by accessing branch node 122, and key-value pairs with keys greater than "50" can be found by accessing branch node 124. Key-value pairs in all nodes of B-tree 100 are sorted based on their keys. For example, a first key-value pair with a first key is stored prior to a second key-value pair with a second key, if the second key is larger than the first key. An example of this is shown in node 122 of B-tree 100, where the key-value pair with key 30 is stored prior to the key-value pair with key 40.

To maintain the sorted order of key-value pairs in a B-tree, new key-value pairs are inserted into the B-tree in a sorted manner as well. For example, in order for a new key-value pair to be inserted into a node of B-tree 100, all the existing key-value pairs in the node are first read (e.g., into random access memory (RAM)), then the new key-value pair is merged into the existing key-value pairs in a sorted manner, and finally a sorted set of key-value pairs is written back to the node. For example, to insert a key-value pair with key "32" into branch node 122, key-value pairs with keys "30" and "40" are first read from node 122. Subsequently, key-value pairs "30" "32" and "40" are merged and sorted, and then written back to node 122, such that after the insert operation, node 122 would include key-value pairs "30" "32" and "40," in that order.

Both B-trees and $B^\varepsilon$-trees may be subdivided into sub-trees. A subtree typically includes part of the complete set of nodes of a tree and includes a subtree root. For example, in B-tree 100, a subtree may be defined with branch node 120 as the subtree root, and include the child nodes of branch node 120.

$B^\varepsilon$-tree 150 stores the same data as stored in B-tree 100, in a different format. $B^\varepsilon$-tree 150 includes nodes 1-4. Nodes of $B^\varepsilon$-tree 150 include, similarly to the nodes of B-tree 100, key-value pairs. For example, data section 164 of node 1 includes the key-value pairs of key "20" and key "50." Like B-tree 100, these key-value pairs may store data as well as pointers to which child nodes to access in order to find other key-value pairs within $B^\varepsilon$-tree 150.

In addition to the key-value pairs, non-leaf nodes of $B^\varepsilon$-tree 150 also include a buffer that stores messages. $B^\varepsilon$-tree 150 includes, as shown, 4 non-leaf nodes and 5 leaf nodes. Leaf nodes of a $B^\varepsilon$-tree do not include a buffer or store messages, unlike other nodes of the $B^\varepsilon$-tree.

A buffer of a $B^\varepsilon$-tree is typically a data structure capable of ordered or sorted storage. For example, a buffer may be a binary tree structure such as a red-black tree or a B-tree, or an array or a set of nested arrays. Messages generally indicate a write operation to be performed on $B^\varepsilon$-tree 150, such as inserting a key-value pair, deleting a key-value pair, or modifying a key-value pair. The message itself may be a key-value pair and have as its key, the key of the key-value pair on which the operation is to be performed, and as its value the operation to be performed on the key-value pair (e.g., add 3 to value, set value to 5, subtract 6 from value, delete key-value pair, insert key-value pair of key X and value Y, etc.). For example, an insert operation may be sent to $B^\varepsilon$-tree 100 to add a new key-value pair. Such an insert operation may be added to the buffer of the root node as an insert message. The insert message includes the details of which key-value pair has been added. Messages may also include a timestamp indicating when a message was received at the buffer. In certain embodiments, messages may be ordered in the buffer, such as in an order of arrival into the buffer. In such embodiments, a timestamp may not be needed to indicate when the message was received at the buffer. Further, messages in the buffer may be ordered by key.

Buffer 162 of node 1 includes two insert messages, "insert(35)" and "insert(49)". The two messages each include a key-value pair, with the key of the key-value pair expressed numerically. For example, insert(35) may correspond to a message with a key 35 and value to insert a key-value pair with key 35 and a corresponding value. At some time, such as when a buffer is filled, messages are flushed from the buffer down to child nodes. In this case, when buffer 162 is full, messages "insert(35)" and insert (49) are flushed to node 3. In another example, if buffer 162 included a message with a key that had a value higher than 50, the message would have been flushed to node 4. Also, if buffer 162 included a message with a key that had a value lower than 20, the message would have been flushed to node 4.

Note that, in a $B^\varepsilon$-tree, messages are written or flushed into buffers in a sorted manner. For example, to flush message "insert(35)" down to node 3's buffer, a read operation is first performed to read the entire contents of node 3's buffer, including messages "insert(25)," "insert(40)," and "insert(45)." Subsequently, message "insert(35)" is merged into messages "insert(25)," "insert(40)," and "insert(45)" in a sorted manner and, finally, the result is written back to the buffer of node 3. As such, after message "insert(35)" is flushed down to the buffer of node 3, the buffer would include messages "insert(25)," "insert(35)," "insert(40)," and "insert(45)," in that order. In some cases, child nodes may need to be created to accommodate flushing of messages. For example, flushing message "insert(35)" to node 3 may cause the buffer of node 3 to be full. If so, child nodes (e.g., 3 child nodes) may be added to node 3. These new nodes would store the key-value pairs specified in the messages stored in the buffer of node 3.

Utilizing buffers in $B^\varepsilon$-trees provides a number of advantages, including, for example, reducing write amplification associated with performing operations on the nodes of the $B^\varepsilon$-tree. This is partly because key-value pairs are written in batches. For example, in $B^\varepsilon$-tree 150, when messages "insert (25)," "insert(40)," and "insert(45)" in the buffer of node 3 are eventually written to leaf 3, only one re-write of leaf 3 is performed. In contrast, in a B-tree, because key-value pairs are written to leaf nodes one by one, writing three key-value pairs to a leaf node at different times would result in the leaf node being re-written three times, once for each key-value pair. For example, each time a new key-value pair is being inserted into a leaf in a B-tree, the contents of the leaf may be read, then the content is merged and sorted with the new key-value pair, and finally the result is written back to the leaf.

Although $B^\varepsilon$-trees reduce write amplification in comparison to B-trees, the I/O operations associated with re-writing a buffer in a sorted manner introduces some new write amplification. As such, in certain aspects, an append-only method may be applied to $B^\varepsilon$-trees, which involves writing messages to buffers in a sequential manner. As a result of using the append-only method, buffers are no longer re-written when messages are flushed down. Instead, messages are appended to the buffers in slots or fragments. A slot is a representation of a data structure, such as an array, that is created for storing a batch of one or more messages that is flushed down to a buffer at a certain time. When a subsequent batch of one or more messages is flushed down to the same buffer at a later time, the batch would be written in a separate slot. In an append-only $B^\epsilon$-tree, data is written to leaves of the tree using the same append-only method.

Figure 2:
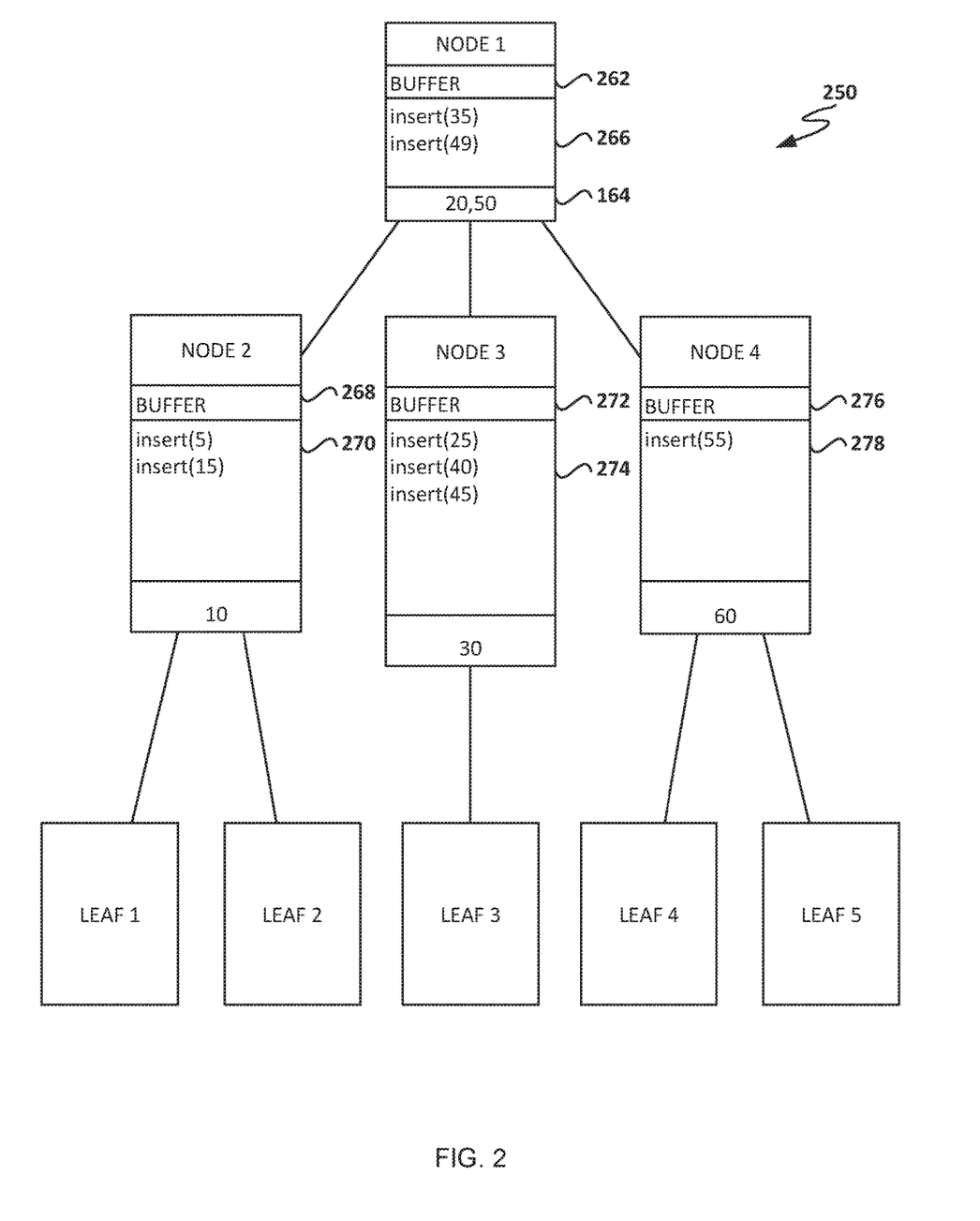
FIG. 2 depicts an example application of append-only operations performed on a $B^\varepsilon$-tree, in accordance with certain aspects.

FIG. 2 illustrates an example application of the append-only method described above. $B^\epsilon$-tree 250 stores the same data as stored in $B^\epsilon$-tree 150, but in a different format. As shown, buffer 262 of node 1 includes slot 266. Slot 266 is created when messages "insert(35)" and "insert(49)" are added to buffer 262. FIG. 2 also shows buffer 268 of node 2 including slot 270, which has been created because, at some point, messages "insert(5)" and "insert(15)" were flushed down to buffer 268 from buffer 162 of node 1. Similarly, buffer 272 of node 3 includes slot 274 including messages "insert(25)," "insert(40)," "insert(45)" and buffer 276 of node 4 includes slot 278 including message "insert (55)."

Each buffer of $B^\epsilon$-tree 250 may store a plurality of slots. When the collective size of the slots in each buffer exceeds the size of the buffer, all the slots in the buffer are read, merged and sorted, and then flushed down to one or more child nodes. For example, after messages "insert(35)" and "insert(49)" are added to buffer 262 and stored in slot 266, additional messages may be received at later points in time, resulting in additional slots (not shown) being created in buffer 262. Once the size of all the slots in buffer 262 exceeds a defined size, the slots, including slot 266, are read into RAM, merged and sorted, and then flushed down to one or more of child nodes 2, 3, and 4, etc.

Figure 3:
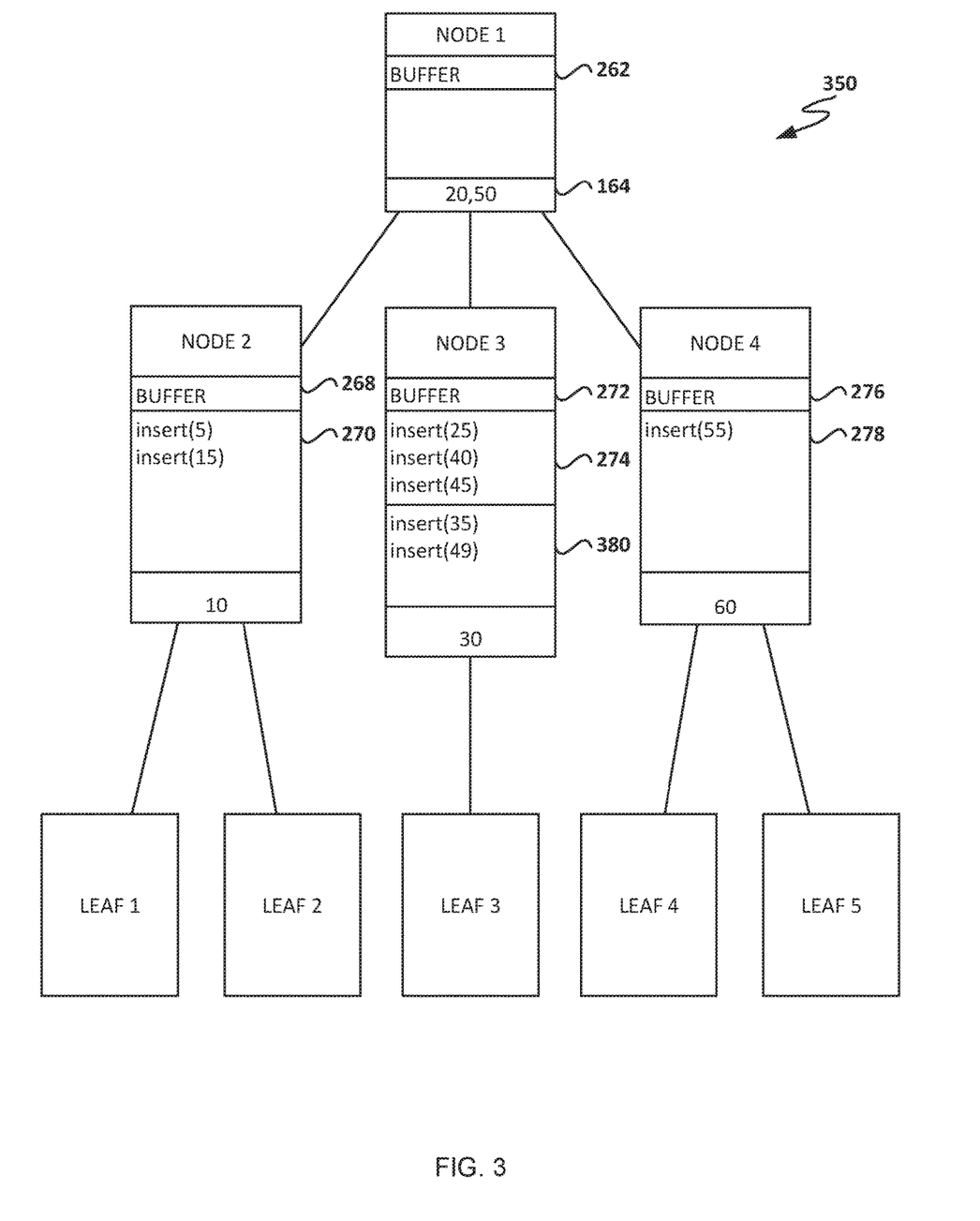
FIG. 3 depicts another example application of append-only operations performed on a $B^\varepsilon$-tree, in accordance with certain aspects.

FIG. 3 illustrates an example application of the append-only method when messages are flushed down from buffer 262 of $B^\epsilon$-tree 250. More specifically, $B^\epsilon$-tree 350 of FIG. 3 represents a state of $B^\epsilon$-tree 250 of FIG. 2 after messages "insert(35)" and "insert(49)" are flushed down and written to buffer 272 of node 3, using the append-only method. As shown, buffer 262 no longer comprises slot 266 while buffer 272 includes two slots 274 and 380, where slot 274 includes messages "insert(25)," "insert(40)," "insert(45)" and slot 380 includes messages "insert(35)" and "insert(49)." Therefore, instead of reading the existing messages in buffer 272, merging them with the new messages, and writing the results back into buffer 272 (such as how existing $B^\epsilon$-trees operate), the append-only method creates a new slot 380 for storing messages that are flushed down from buffer 262 into buffer 272. Note that in an append-only $B^\epsilon$-tree, data in the nodes, including non-leaf nodes and leaves, may no longer always be sorted. An example of this is buffer 272 of node 3 including unsorted messages with keys: "25," "40," "45," "35," "49." A sorted version of such messages would include keys: "25," "35," "40," "45," "49."

If additional messages are flushed down to buffer 272 at a later time, a new and third slot would be created for storing such massages. Eventually, when buffer 272 is full, messages of all the slots within buffer 272 may be read, merged and sorted, and written to leaf 3 in an append-only manner. As a result of such an operation, for example, a slot would be created within leaf 3 (not shown) that would include all the key-value pairs corresponding to the messages. As additional messages are applied to leaf 3, additional slots are created and written to leaf 3. Although the application of the append-only method to $B^\epsilon$-trees results in a reduction in write-amplification, querying append-only $B^\epsilon$-trees is less efficient and results in more overhead because messages and/or key-value pairs in the nodes are no longer always sorted in append-only $B^\epsilon$-trees.

As a result, for example, a query operation for a key in a certain buffer may potentially lead to searching all keys in all slots of the buffer. Similarly, a query operation for a key in a certain leaf may potentially lead to searching all keys in all slots of the leaf. As each slot in an append-only $B^\epsilon$-tree may contain a significant amount of information (e.g., gigabytes of data), performing query operations in such a manner is not efficient. As such, in order to enhance the efficiency and reduce the overhead associated with query operations performed on append-only $B^\epsilon$-trees, in certain aspects, one of a number of data structures or filters may be created for each of the slots and stored in memory (e.g., RAM) for use during query operations, as described below. A commonly used example of such filters is the bloom filter, although other examples may include quotient filters, cuckoo filters, or other compact data structures. A bloom filter is a probabilistic data structure that is extremely space efficient and is able to indicate whether a key is possibly in a corresponding slot or whether the key is definitely not in the corresponding set. In other words, false positives are possible with a bloom filter but false negatives are not.

Figure 4:
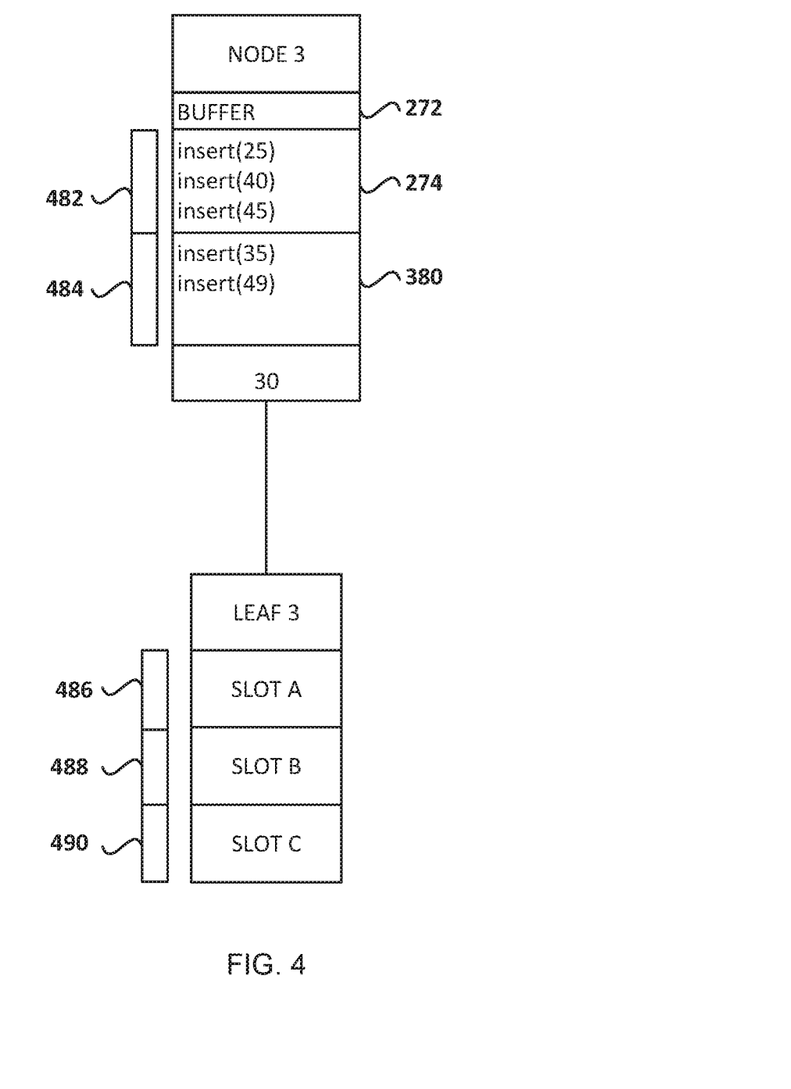
FIG. 4 shows example bloom filters created for a number of slots of the $B^\varepsilon$-tree in FIG. 3

FIG. 4 shows an example of bloom filters 484 and 482 created for slots 274 and 380 of buffer 272 in node 3 of $B^\epsilon$-tree 350. FIG. 4 also shows bloom filters 486-490 created for slots A-C, respectively, of leaf 3. For simplicity, bloom filters for other slots of other nodes in FIG. 3 are not shown. By using bloom filters, a query operation may much more efficiently determine whether a queried key is stored in the nodes of an append-only $B^\epsilon$-tree. More specifically, because bloom filters are space efficient, they can be stored in memory such that a query operation seeking a certain key may first examine an append-only $B^\epsilon$-tree's bloom filters in memory. If a bloom filter indicates that the queried key is not present in its corresponding slot, then there is no need for performing a disk operation to examine that slot for that query.

Although using bloom filters optimizes query operations associated with an append-only $B^\epsilon$-tree, storing the filters in memory may require a significant amount of memory space. In certain cases, bloom filters associated with a large append-only $B^\epsilon$-tree may comprise such a large size such that storing them in memory may not even be possible. Note that a significant portion of the collective size of an append-only $B^\epsilon$-tree's bloom filters corresponds to bloom filters associated with the leaves of the tree. This is because a $B^\epsilon$-tree stores exponentially more data in its leaves than its non-leaf nodes. As such, in certain examples, about 90% of the collective size of a $B^\epsilon$-tree's bloom filters corresponds to the size of the leaves' bloom filters. The large amount of memory space required for storing bloom filters of an append-only $B^\epsilon$-tree in RAM poses a technical problem.

Accordingly, the aspects described herein relate to a new type of $B^\epsilon$-tree (referred to as "the new $B^\epsilon$-tree") and a method of storing data therein, which provide a technical solution to the technical problem described above. More specifically, for the new $B^\epsilon$-tree, no bloom filters are created for data that is stored in the leaves of the tree. In other words, bloom filters are only created for the non-leaf nodes. This technical solution significantly reduces the size and number of bloom filters as compared to the number of bloom filters used for an append-only $B^\epsilon$-tree. As such, storing bloom filters associated with the new $B^\epsilon$-tree occupies significantly less memory space. Eliminating the leaves' bloom filters, however, reduces the efficiency of query operations performed with respect to the leaves. In other words, because data is stored in the leaves in an append-only manner, querying for a key would result in searching through potentially unsorted data, which is more resource inefficient than searching through sorted data. As such, in the new $B^\epsilon$-tree, data is stored in the leaves in a sorted manner. In other words, when messages are flushed down from a node to a leaf, for example, data within the leaf is read into memory, then data that is being flushed down is applied to the leaf in a sorted manner, and finally the result is written back to the leaf. Note that in certain aspects, the new $B^\varepsilon$-tree may be stored in storage resources (e.g., disk, SSD, etc.) associated with a computing device (e.g., physical or virtual). Storage resources associated with the computing device include storage resources of the computing device (e.g., local storage resources) and/or storage resources connected to the computing device over a network.

Figure 5:
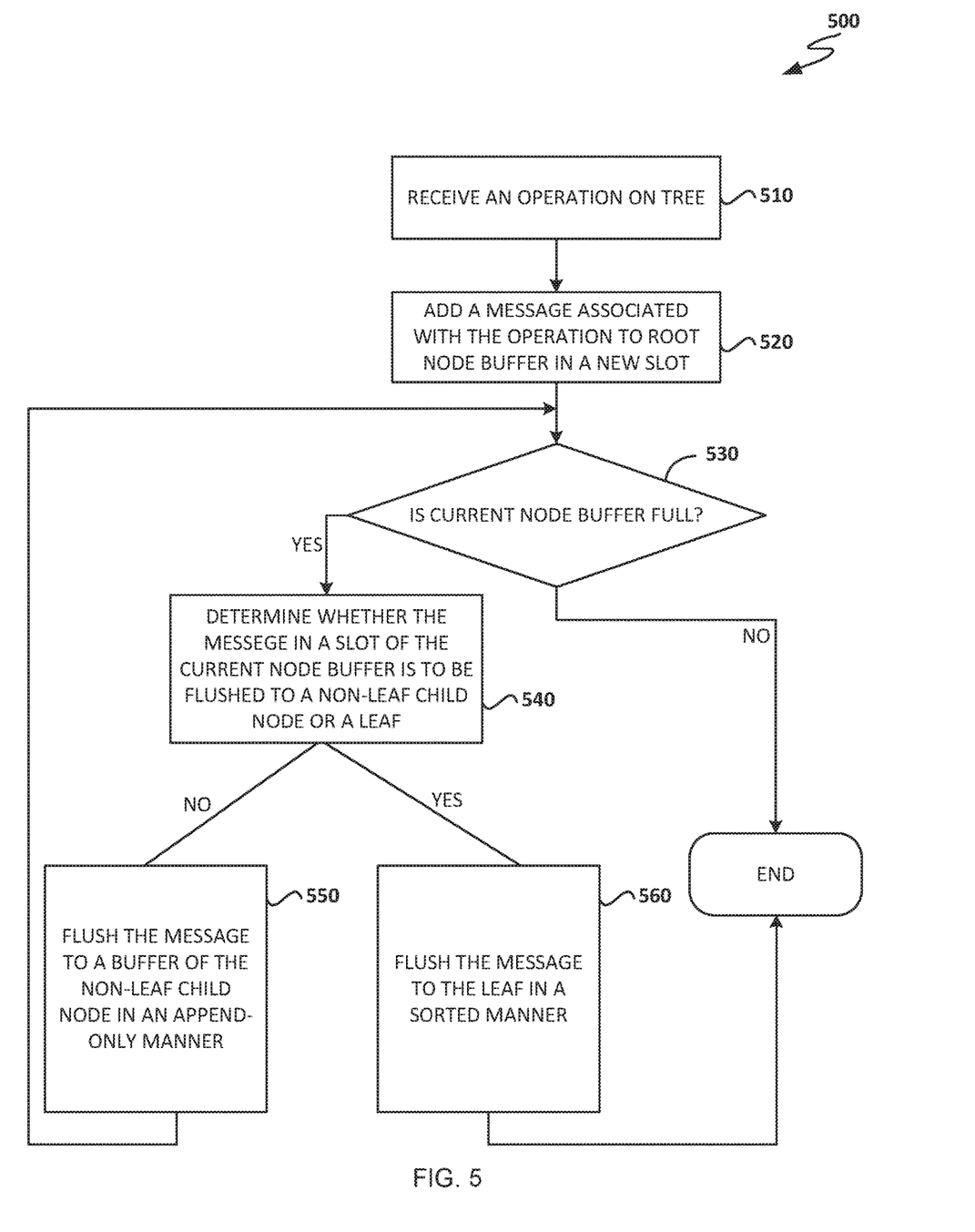
FIG. 5 depicts a flow diagram of example operations performed on a $B^\varepsilon$-tree, in accordance with certain aspects.

FIG. 5 depicts a flow diagram of example operations 500 performed on a $B^\varepsilon$-tree described in the aspects herein.

As shown, at block 510, an operation to perform on the $B^\varepsilon$-tree is received. Apart from queries, operations performed on a tree typically include write operations, such as insertions, modifications, or deletions of data in the $B^\varepsilon$-tree.

At block 520, the operation is stored as a message in the root node's buffer in an append-only manner. More specifically, the message may be part of a batch of one or more messages that is stored in a slot in the root node's buffer. When a subsequent batch of one or more messages is received at a later time, the subsequent batch is written in a separate slot of the root node's buffer. For each slot a filter, such as a bloom filter, is created to optimize query operations associated with the slot. Note that a current node for operations 500 is set as the root node.

At block 530, it is determined if a buffer of a current node of the $B^\varepsilon$-tree is full. In certain aspects, the buffer of a node (e.g., root node or child node) is considered to be full when the buffer does not have enough storage space allocated for a new slot that comprises a newly received batch of one or more messages. If the current node buffer is full, operations 500 proceed to block 540. If the current node buffer is not full, operations 500 end.

At block 540, it is determined whether the message in a slot of the current node buffer is to be flushed to a non-leaf child node or a leaf. In one example, such a determination may be made on whether the current node has a non-leaf child node or not. If it is determined that the message is to be flushed down to a buffer of a non-leaf child node, the message is flushed down to that buffer and stored in an append-only manner, as described in relation to block 550. If it is determined that the message is to be applied to a leaf, the message is applied to the leaf in a sorted manner, as described in relation to block 560.

At block 550, the message is flushed to a buffer of a non-leaf child node in an append-only manner. More specifically, all the slots in the current node buffer, including the slot that stores the message, are read into RAM. All the messages in the slots are then merged and sorted. Subsequently, the message, which is now one of a number of sorted messages, is flushed down to a buffer of a non-leaf child node in an append-only manner. An example of this was described above with reference to messages "insert(35)" and "insert(49)" in FIG. 3 being flushed from buffer 262 of node 1 to slot 380 of buffer 272 of node 3. In this example, the message referred to at blocks 510-550 of the operations may be one of messages "insert(35)" and "insert(49)." A filter, such as a bloom filter, is also created for the slot, in the non-leaf child node, that comprises the message. Once block 550 is performed, the current node is then set to the child node that the message is flushed to and operations 500 return to 530.

At block 560, the message in the current node buffer is flushed to a leaf of the $B^\varepsilon$-tree in a sorted manner. Flushing the message to the leaf node in a sorted manner includes reading the contents (e.g., key-value pairs) of the leaf into RAM, applying the message to the contents by performing the operation indicated by the message, and then merging, sorting, and writing back the contents to the leaf. The operation of block 560 may be illustrated with reference to node 3 of FIG. 3. Buffer 272 of node 3 comprises slot 274, including messages "insert(25)," "insert(40)," "insert(45)," and slot 380, including messages "insert(35)" and "insert (49)." In this example, the message referred to at blocks 510-540 and 560 of the operations may be any one of messages "insert(25)," "insert(40)," "insert(45)," "insert (35)," and "insert(49)."

In FIG. 3, leaf 3 stores key-value pairs within the key range of 10-60. As an example, leaf 3 may include key-value pairs with keys "15," "24," and "36." In such an example, when buffer 272 is full and slots 276 and 380 are flushed to leaf 3, the key-value pairs in leaf 3 are read into RAM and, subsequently, the messages in slots 276 and 380 are applied such that key-value pairs with keys 25, 40, 45, 35 and 49 are inserted in a sorted manner into the existing key-value pairs with keys "15," "24," and "36." In this example, the result of such an operation includes a sorted number of key-value pairs with keys "15," "24," "25," "35," "36," "40," "45," "49." These key-value pairs are then written to leaf 3 again. Note that the operation described above is merely an example of how messages may be flushed and applied to a leaf in a sorted manner. Once bock 560 is performed, operations 500 end.

Using the method described herein for storing data in a $B^\varepsilon$-tree, results in the new $B^\varepsilon$-tree, which stores data in its leaves in a sorted manner, while data within its non-leaf nodes is stored in a sequential and append-only manner, potentially resulting in the non-leaf nodes comprising unsorted data. Also, each of the slots within buffers of the non-leaf nodes of the new $B^\varepsilon$-tree has a filter that is stored in RAM for query operations. As such, when a query operation is received, the filters associated with the slots in the non-leaf nodes of the new $B^\varepsilon$-tree are first examined. If one or more of the filters indicate that the key associated with the query operation is in one or more corresponding slots, then disk operations are performed to search the one or more slots. If none of the filters indicates that the key is in its corresponding slot, the leaves of the new $B^\varepsilon$-tree are searched, using one or more search algorithms such as a sequential search algorithm. However, because the leaves of the new $B^\varepsilon$-tree are sorted, query operations performed on the leaves are more efficient and result in less overhead. Note that although the aspects herein were described with reference to $B^\varepsilon$-trees, other types of write-optimized key-value data structures that use fragmentation may also be optimized using the aspects described herein. Fragmentation refers to a technique of sequentially writing (e.g., append-only technique) data in nodes of a write-optimized key-value data structure in fragments or slots.

Figure 6:
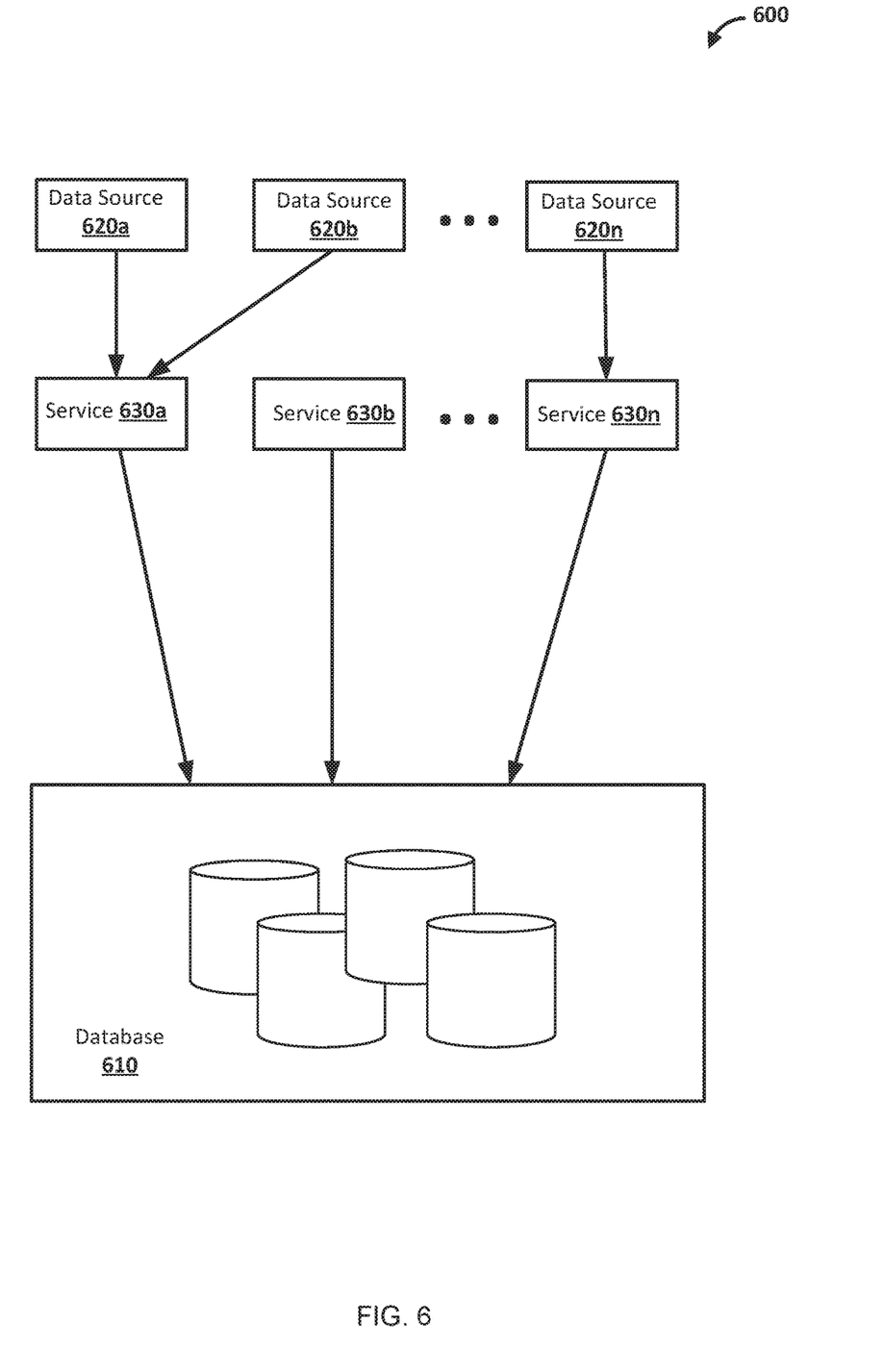
FIG. 6 illustrates components of an example system in which an embodiment may be implemented.

FIG. 6 illustrates components of a system 600 in which an embodiment may be implemented. As shown, system 600 includes a database 610, multiple data sources 620 (e.g., data sources 620a, 620b, . . . , 620n), and multiple database management services 630 (e.g., database management services 630a, 630b, . . . 630n). Though multiple data sources 620 and multiple database management services 630 are shown, it should be noted that there may be any number of data sources or database management services in system 600.

Database 610 may include any suitable non-volatile data store for organizing and storing data from the multiple data sources 620. For example, in some embodiments, database 610 may be implemented as software-defined storage such as VMware vSAN that clusters together server-attached hard disk drives and/or solid state drives (HDDs and/or SSDs), to create a flash-optimized, highly resilient shared datastore designed for virtual environments. In some embodiments, database 610 may be implemented as one or more storage devices, for example, one or more hard disk drives, flash memory modules, solid state disks, and optical disks (e.g., in a computing device, server, etc.). In some embodiments, database 610 may include a shared storage system having one or more storage arrays of any type such as a network-attached storage (NAS) or a block-based device over a storage area network (SAN). Database 610 may store data from one or more data sources 620 in a B i-tree structure as discussed.

Each data source 620 may correspond to one or more physical devices (e.g., servers, computing devices, etc.) or virtual devices (e.g., virtual computing instances, containers, virtual machines (VMs), etc.). For example, a physical device may include hardware such as one or more central processing units, memory, storage, and physical network interface controllers (PNICs). A virtual device may be a device that represents a complete system with processors, memory, networking, storage, and/or BIOS, that runs on a physical device. For example, the physical device may execute a virtualization layer that abstracts processor, memory, storage, and/or networking resources of the physical device into one more virtual devices. Each data source 620 may generate data that is loaded into database 610. Each data source 620 may request operations to be performed on the database 610, such as a range lookup as discussed.

Each database management service 630 may be a process or application executing on one or more physical devices or virtual devices. In certain embodiments, a database management service 630 may execute on the same device as a data source 620. In certain embodiments, a database management service 630 may execute on a separate device from the data source 620. A database management service 630 may be an automatic service, or a manual service (e.g., directed by a human).

Each database management service 630 may be coupled (e.g., via a network, as running on the same device, etc.) to one or more data sources 620 and to the database 610 (e.g., via a network). Further, each database management service 630 may be configured to generate and perform operations on database 610. For example, a given data source 620 may send an operation to a database management service 630 to be performed on database 610. The operation may be one of a write, update (e.g., set the value, add, subtract, multiply, delete, change, etc.), or query operation. Database 610 may be implemented as a $B^\varepsilon$-tree (the new $B^\varepsilon$-tree) as discussed above. A database management service 630 may unitize the techniques and aspects described herein (e.g., operation 500 of FIG. 5) when performing an operation on database 610. More specifically, data is stored in non-leaf nodes of database 610 in an append-only manner, such that, for example, buffers of each of the non-leaf nodes may comprise one or more slots including one or more messages. Filters are stored in memory resources (e.g., RAM) associated with a physical or virtual device that executes a corresponding database management service 630. Further, data is stored in leaf nodes of database 610 in sorted manner, as described above. Filters are not used for query operations associated with the leaf nodes.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory, a flash memory device, a NVMe device, a non-volatile memory device, a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for performing an operation on a $B^\varepsilon$-tree that is stored in storage resources associated with a computing device, comprising:
   receiving the operation on the $B^\varepsilon$-tree;
   writing a message associated with the operation to a first slot in a first buffer of a first non-leaf node of the $B^\varepsilon$-tree in an append-only manner, wherein:
      the first slot comprises a first filter that is stored in memory resources associated with the computing device, and
      the first filter is used for query operations associated with the first slot;
   determining that the first buffer is full;
   upon determining to flush the message to a non-leaf child node, flushing the message in an append-only manner to a second slot in a second buffer of the non-leaf child node, wherein:
      the second slot comprises a filter that is stored in the memory resources,
      the second filter is used for query operations associated with the second slot; and
   upon determining to flush the message to a leaf node, flushing the message to the leaf node in a sorted manner.

2. The method of claim 1, wherein flushing the message in the append-only manner to the second slot further comprises:
   reading a number of slots in the first buffer including the first slot;
   merging a number of messages associated with the number of slots, the number of messages including the message;
   sorting the number of messages based on their corresponding keys; and
   selecting the message for the flushing.

3. The method of claim 1, wherein flushing the message to the leaf node in the sorted manner further comprises:
   reading a number of key-value pairs in the leaf node;
   applying the message by performing the operation;
   sorting the number of key-value pairs based on their corresponding keys after the operation is performed; and
   writing the number of key-value pairs back to the leaf node after the sorting.

4. The method of claim 1, wherein:
   the operation comprises an insertion operation for inserting a key-value pair;
   flushing the message to the leaf node in the sorted manner further comprises:
      reading a number of key-value pairs in the leaf node;
      performing the operation to insert the key-value pair;
      sorting, after the operation is performed, the number of key-value pairs and the key-value pair based on their corresponding keys; and
      writing the number of key-value pairs and the key-value pair back to the leaf node after the sorting.

5. The method of claim 1, further comprises:
   receiving a query operation on the $B^\varepsilon$-tree; and
   upon querying filters, including the first and the second filters, associated with all non-leaf nodes of the $B^\varepsilon$-tree, including the first non-leaf node and the non-leaf child node, searching one or more leafs of the $B^\varepsilon$-tree in a sequential manner.

6. An apparatus, comprising:
   a non-transitory memory comprising executable instructions; and
   a processor in data communication with the memory and configured to execute the instructions to cause the apparatus to:
      receive an operation on a $B^\varepsilon$-tree stored in storage resources associated with the apparatus;
      write a message associated with the operation to a first slot in a first buffer of a first non-leaf node of the $B^\varepsilon$-tree in an append-only manner, wherein:
         the first slot comprises a first filter that is stored in the memory, and
         the first filter is used for query operations associated with the first slot;
      determining that the first buffer is full;
      upon determining to flush the message to a non-leaf child node, flush the message in an append-only manner to a second slot in a second buffer of the non-leaf child node, wherein:
         the second slot comprises a filter that is stored in the memory,
         the second filter is used for query operations associated with the second slot; and
      upon determining to flush the message to a leaf node, flush the message to the leaf node in a sorted manner.

7. The apparatus of claim 6, wherein the processor being configured to cause the apparatus to flush the message in the append-only manner to the second slot comprises the processor being configured to cause the apparatus to:
   read a number of slots in the first buffer including the first slot;
   merge a number of messages associated with the number of slots, the number of messages including the message;
   sort the number of messages based on their corresponding keys; and
   select the message for the flushing.

8. The apparatus of claim 6, wherein the processor being configured to cause the apparatus to flush the message to the leaf node in the sorted manner comprises the processor being configured to cause the apparatus to:
   read a number of key-value pairs in the leaf node;
   apply the message by performing the operation;
   sort the number of key-value pairs based on their corresponding keys after the operation is performed; and
   write the number of key-value pairs back to the leaf node after the sorting.

9. The apparatus of claim 6, wherein:
   the operation comprises an insertion operation for inserting a key-value pair, and
   wherein the processor being configured to cause the apparatus to flush the message to the leaf node in the sorted manner comprises the processor being configured to cause the apparatus to:

read a number of key-value pairs in the leaf node;
perform the operation to insert the key-value pair;
sorting, after the operation is performed, the number of key-value pairs and the key-value pair based on their corresponding keys; and
writing the number of key-value pairs and the key-value pair back to the leaf node after the sorting.

10. The apparatus of claim 6, wherein the processor is further configured to cause the apparatus to:
receive a query operation on the $B^\epsilon$-tree; and
upon querying filters, including the first and the second filters, associated with all non-leaf nodes of the $B^\epsilon$-tree, including the first non-leaf node and the non-leaf child node, search one or more leafs of the $B^\epsilon$-tree in a sequential manner.

11. A non-transitory computer readable medium having instructions stored thereon that, when executed by a computing system, cause the computing system to perform a method comprising:
receiving an operation on a $B^\epsilon$-tree stored in storage resources associated with the computing system;
writing a message associated with the operation to a first slot in a first buffer of a first non-leaf node of the $B^\epsilon$-tree in an append-only manner, wherein:
the first slot comprises a first filter that is stored in memory resources associated with the computing system, and
the first filter is used for query operations associated with the first slot;
determining that the first buffer is full;
upon determining to flush the message to a non-leaf child node, flushing the message in an append-only manner to a second slot in a second buffer of the non-leaf child node, wherein:
the second slot comprises a filter that is stored in the memory resources,
the second filter is used for query operations associated with the second slot; and
upon determining to flush the message to a leaf node, flushing the message to the leaf node in a sorted manner.

12. The non-transitory computer readable medium 11, wherein flushing the message in the append-only manner to the second slot further comprises:
reading a number of slots in the first buffer including the first slot;
merging a number of messages associated with the number of slots, the number of messages including the message;
sorting the number of messages based on their corresponding keys; and
selecting the message for the flushing.

13. The non-transitory computer readable medium 11, wherein flushing the message to the leaf node in the sorted manner further comprises:
reading a number of key-value pairs in the leaf node;
applying the message by performing the operation;
sorting the number of key-value pairs based on their corresponding keys after the operation is performed; and
writing the number of key-value pairs back to the leaf node after the sorting.

14. The non-transitory computer readable medium 11, wherein:
the operation comprises an insertion operation for inserting a key-value pair;
flushing the message to the leaf node in the sorted manner further comprises:
reading a number of key-value pairs in the leaf node;
performing the operation to insert the key-value pair;
sorting, after the operation is performed, the number of key-value pairs and the key-value pair based on their corresponding keys; and
writing the number of key-value pairs and the key-value pair back to the leaf node after the sorting.

15. The non-transitory computer readable medium 11, wherein the method further comprises:
receiving a query operation on the $B^\epsilon$-tree; and
upon querying filters, including the first and the second filters, associated with all non-leaf nodes of the $B^\epsilon$-tree, including the first non-leaf node and the non-leaf child node, searching one or more leafs of the $B^\epsilon$-tree in a sequential manner.

* * * * *